(12) United States Patent
Sakata et al.

(10) Patent No.: US 6,341,058 B1
(45) Date of Patent: Jan. 22, 2002

(54) ELECTRIC DOUBLE LAYER CAPACITOR AND METHOD OF FORMING THE SAME

(75) Inventors: Koji Sakata; Kazuya Mimura; Yutaka Nakazawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/537,731

(22) Filed: Mar. 30, 2000

(30) Foreign Application Priority Data

Mar. 30, 1999 (JP) .............................. 11-087825

(51) Int. Cl.$^7$ ................................................ H01G 9/00
(52) U.S. Cl. ....................................................... 361/502
(58) Field of Search ................................. 361/502, 503, 361/504, 511–512

(56) References Cited

U.S. PATENT DOCUMENTS

| | | | | |
|---|---|---|---|---|
| 5,303,118 A | * | 4/1994 | Saito et al. ................... | 361/502 |
| 5,621,607 A | * | 4/1997 | Farahmandi et al. ........ | 361/502 |
| 5,859,761 A | * | 1/1999 | Aoki et al. ................... | 361/502 |
| 6,021,039 A | * | 2/2000 | Inagawa ....................... | 361/502 |

\* cited by examiner

*Primary Examiner*—Anthony Dinkins
(74) *Attorney, Agent, or Firm*—Young & Thompson

(57) ABSTRACT

The present invention provides an electric double layer capacitor having a pail of polarized electrodes separated by a separator, the polarized electrodes having surfaces facing to the separator, wherein substantially entire parts of the surfaces of the polarized electrodes are spaced from the separator to form inner spaces between the polarized electrodes and the separator.

14 Claims, 1 Drawing Sheet

ELECTRIC DOUBLE LAYER CAPACITOR AND METHOD OF FORMING THE SAME

BACKGROUND OF THE INVENTION

The present invention relates to an electric double layer capacitor and a method of forming the same, and more particularly to an electric double layer capacitor with an improved surface structure of a polarized electrode.

In recent years, there has been required a capacitor having a long life-time and a large energy density for storing an energy generated by an energy source or a solar battery, wherein the capacitor is used in combination with the energy source for driving a motor or the solar battery. An electric double layer capacitor has been developed as such the battery A first conventional electric double layer capacitor is disclosed in Japanese patent publication No. 2722021. Top and bottom cylindrically-shaped non-conductive rubber sealing members are separated by a porous separator. Inner spaces of the top and bottom cylindrically-shaped non-conductive rubber sealing members are filled with an active carbon paste. To and bottom collectors seal the top and bottom portions of the top and bottom cylindrically-shaped non-conductive rubber sealing members. The active carbon paste electrode has a flat surface. The above Japanese patent publication is silent on any description about surface shape of polarized electrodes.

A second conventional electric double layer capacitor is disclosed in Japanese laid-open patent publication No. 3-124013. Two solid-state polarized electrodes are separated by a separator. The two solid-state polarized electrodes have recessed portions adjacent to opposite surfaces of the separator, wherein the recessed portions extend on center regions of the two solid-state polarized electrodes, thereby forming two inner spaces adjacent to the opposite surfaces of the separator. The two inner spaces are filled with an impregnant which comprises a pasted mixture of an electrolytic solution with active carbon powders or active carbon fibers.

The above described first and second conventional electric double layer capacitors use polymers such as rubbers and plastics as a seating material and a collector material. Under a high temperature condition, the electrolytic solution may transmit through the sealing material and the collector material, whereby an amount of the electrolytic solution in the capacitor is gradually decreased, whereby an ion-conductivity is gradually reduced. The reduction in ion-conductivity results in an increase in internal-resistance of the capacitor. Namely, if the above first and second conventional electric double layer capacitors are placed under a high temperature condition for a long time, then the internal resistance is increased.

In the above circumstances, it had been required to develop a novel electric double layer capacitor free from the above problem.

SUMMARY OF THE INVENTION

Accordingly, it is an object of the present invention to provide a novel electric double layer capacitor free from the above problems.

It is a further object of the present invention to provide a novel electric double layer capacitor free of any substantive increase in internal-resistance even if the electric double layer capacitor is placed under a high temperature condition for a long time.

It is a still further object of the present invention to provide a novel surface structure of an polarized electrode in an electric double layer capacitor free from the above problems.

It is yet a further object of the present invention to provide a novel surface structure of an polarized electrode in an electric double layer capacitor free of any substantive increase in internal-resistance even if the electric double layer capacitor is placed under a high temperature condition for a long time.

It is moreover of the present invention to provide a novel method of forming an electric double layer capacitor free from the above problems.

It is still more object of the present invention to provide a novel method of forming an electric double layer capacitor free of any substantive increase in internal-resistance even if the electric double layer capacitor is placed under a high temperature condition for a long time.

The present invention provides an electric double layer capacitor having a pair of poled electrodes separated by a separator, the polarized electrodes having surfaces facing to the separator, wherein substantially entire parts of the surfaces of the polarized electrodes are spaced from the separator to form inner spaces between the polarized electrodes and the separator.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
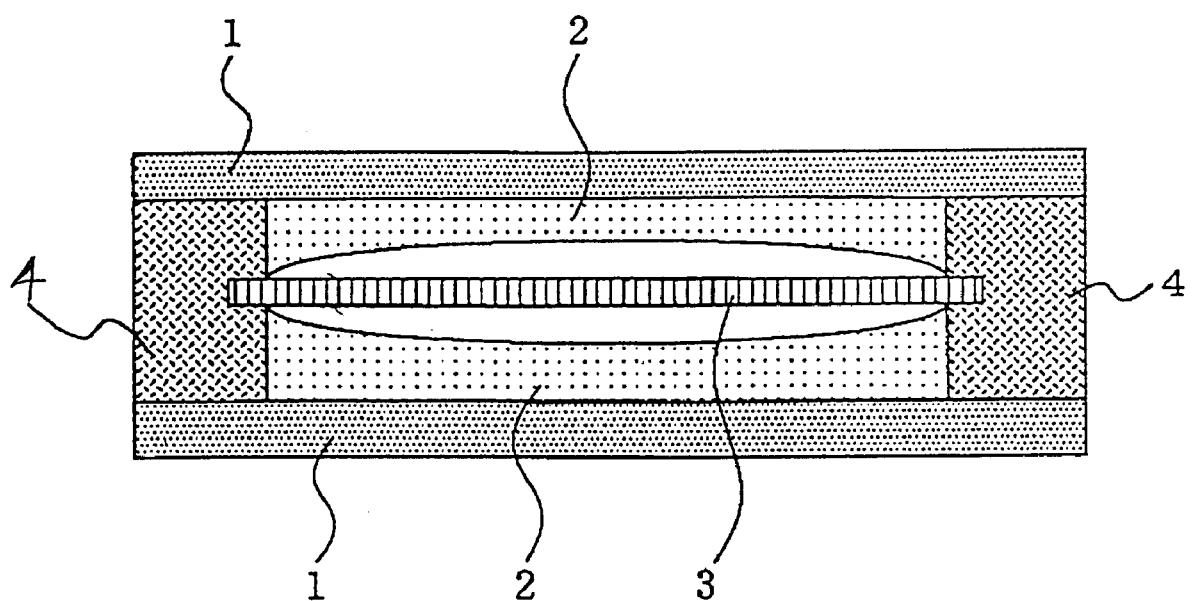
FIG. 1 is a cross sectional elevation view illustrative of a novel electric double layer capacitor in accordance with the present invention.

The present invention provides an electric double layer capacitor having a pair of polarized electrodes separated by a separator, the polarized electrodes having surfaces facing to the separator, wherein substantially entire parts of the surfaces of the polarized electrodes are spaced from the separator to form inner spaces between the polarized electrodes and the separator.

It is preferable that concave portions extend over substantially entire parts of the surfaces of the polarized electrodes.

It is preferable that each of the concave portions has a depth in a range of 2–50 micrometers.

It is preferable that the inner spaces are filled with an electrolytic solution.

It is further preferable that the inner spaces have substantially the same amount of the electrolytic solution.

It is further more preferable that the inner spaces are symmetrical in cross-sectioned shape with reference to the separator In accordance with the first present invention, the inner spaces are formed between opposite surfaces of the separator and the surfaces of the polarized electrodes so that the inner spaces contain additional amounts of the electrolytic solution of the capacitor, in order to increase the total amount of the electrolytic solution of the capacitor without enlargement in size of the capacitor. The increase in the total amount of the electrolytic solution suppresses the above described problem phenomenon of increase in the internal resistance of the capacitor due to less amount of the remaining electrolytic solution in the capacitor. If the total amount of the electrolytic solution is decreased to become Under a certain critical amount of the capacitor, then the internal resistance of the capacitor is increased. The inner spaces containing the electrolytic solution between the separator and the polarized electrodes increases the total amount of the electrolytic solution of the capacitor, thereby increasing a difference of the certain critical amount of the electrolytic solution from the initial amount of the electrolytic solution in the capacitor. Even it is difficult to avoid any slight leakage of the electrolytic solution from the capacitor under a high temperature condition, thereby gently decreasing the electrolytic solution, then it is possible to delay appearance of increase in the internal resistance of the capacitor. As described above, if the surfaces of the polarized electrodes have concave portions to form the inner spaces, the depth of the concave portions is preferably in the range of 2–50 micrometers. If the depth of the concave portions is less than 2 micrometers, then the volume of the inner spaces or the amount of the electrolytic solutions in the inner spaces is too less to obtain the above advantage in delaying appearance of increase in the internal resistance of the capacitor If the depth of the concave portions is over 50 micrometers, then the separator is likely to adhere with any one of the surfaces of the polarized electrodes, whereby a large difference in volume of the inner spaces containing the electrolytic solution is caused. Namely, a large difference in amount of the electrolytic solutions contained in the inner spaces separated by the separator is caused. This large difference in volume of the inner spaces containing the electrolytic solution or large difference in amount of the electrolytic solutions contained in the inner spaces separated by the separator causes an increase in the internal resistance of the capacitor. For those reasons, the preferable range in depth of the concave portions of the surfaces of the polarized electrodes is 2–50 micrometers.

The second present invention provides an electric double layer capacitor comprising; a separator; a pair of polarized electrodes separated from each other by the separator; a pair of collectors sandwiching the polarized electrodes; a pair of gaskets provided at opposite sides of the separator, so that the gaskets are in contact tightly with opposite side surfaces of the polarized electrodes, and the gaskets are sandwiched between outside portions of the collectors, wherein substantially entire parts of the surfaces of the polarized electrodes are spaced from the separator to form inner spaces between the polarized electrodes and the separator.

It is preferable that concave portions extend over substantially entire pans of the surfaces of the polarized electrodes.

It is also preferable that each of the concave portions has a depth in a range of 2–50 micrometers.

It is also preferable that the inner spaces are filled with an electrolytic solution.

It is further preferable that the inner spaces have substantially the same amount of the electrolytic solution.

It is furthermore preferable that the inner spaces are symmetrical in cross-sectioned shape with reference to the separator.

In accordance with the second present invention, the inner spaces are formed between opposite surfaces of the separator and the surfaces of the polarized electrodes, so that the inner spaces contain additional amounts of the electrolytic solution of the capacitor, in order to increase the total amount of the electrolytic solution of the capacitor without enlargement in size of the capacitor. The increase in the total amount of the electrolytic solution suppresses the above described problem phenomenon of increase in the internal resistance of the capacitor due to less amount of the remaining electrolytic solution in the capacitor. If the total amount of the electrolytic solution is decreased to become under a certain critical amount of the capacitor, then the internal resistance of the capacitor is increased. The inner spaces containing the electrolytic solution between the separator and the polarized electrodes increases the total amount of the electrolytic solution of the capacitor, thereby increasing a difference of the certain critical amount of the electrolytic solution from the initial amount of the electrolytic solution in the capacitor. Even it is difficult to avoid any slight leakage of the electrolytic solution from the capacitor under a high temperature condition, thereby gently decreasing the electrolytic solution, then it is possible to delay appearance of increase in the internal resistance of the capacitor. As described above, if the surfaces of the polarized electrodes have concave portions to form the inner spaces, the depth of the concave portions is preferably in the range of 2–50 micrometers. If the depth of the concave portions is less than 2 micrometers, then the volume of the inner spaces or the amount of the electrolytic solutions in the inner spaces is too less to obtain the above advantage in delaying appearance of increase in the internal resistance of the capacitor. If the depth of the concave portions is over 50 micrometers, then the separator is likely to adhere with any one of the surfaces of the polarized electrodes, whereby a large difference in volume of the inner spaces containing the electrolytic solution is caused. Namely, a large difference in amount of the electrolytic solutions contained in the inner spaces separated by the separator is caused. This large difference in volume of the inner spaces containing the electrolytic solution or large difference in amount of the electrolytic solutions contained in the inner spaces separated by the separator causes an increase in the internal resistance of the capacitor. For those reasons, the preferable range in depth of the concave portions of the surfaces of the polarized electrodes is 2–50 micrometers.

The third present invention provides a polarized electrode surface facing to a separator in an electrical double layer capacitor, wherein substantially entire parts of the polarized electrode surface is spaced from the separator to form inner spaces between the polarized electrode surface and the separator.

It is preferable that a concave portion extends over substantially an entire part of the polarized electrode surface.

It is further preferable that the concave portion has a depth in a range of 2–50 micrometers.

It is also preferable that the inner space is filled with an electrolytic solution.

In accordance with the third present invention, the inner spaces are formed between opposite surfaces of the separator and the surfaces of the polarized electrodes so that the inner spaces contain additional amounts of the electrolytic solution of the capacitor, in order to increase the total amount of the electrolytic solution of the capacitor without enlargement in size of the capacitor. The increase in the total amount of the electrolytic solution suppresses the above described problem phenomenon of increase in the internal resistance of the capacitor due to less amount of the remaining electrolytic solution in the capacitor. If the total amount of the electrolytic solution is decreased to become under a certain critical amount of the capacitor, then the internal resistance of the capacitor is increased. The inner spaces containing the electrolytic solution between the separator and the polarized electrodes increases the total amount of the electrolytic solution of the capacitor, thereby increasing a difference of the certain critical amount of the electrolytic solution from the initial amount of the electrolytic solution in the capacitor. Even it is difficult to avoid any slight leakage of the electrolytic solution from the capacitor under a high temperature condition, thereby gently decreasing the electrolytic solution, then it is possible to delay appearance of increase in the internal resistance of the capacitor. As described above, if the surfaces of the polarized electrodes have concave portions to form the inner spaces, the depth of the concave portions is preferably in the range of 2–50 micrometers. If the depth of the concave portions is less than 2 micrometers, then the volume of the inner spaces or the amount of the electrolytic solutions in the inner spaces is too less to obtain the above advantage in delaying appearance of increase in the internal resistance of the capacitor If the depth of the concave portions is over 50 micrometers, then the separator is likely to adhere with any one of the surfaces of the polarized electrodes, whereby a large difference in volume of the inner spaces containing the electrolytic solution is caused. Namely, a large difference in amount of the electrolytic solutions contained in the inner spaces separated by the separator is caused. This large difference in volume of the inner spaces containing the electrolytic solution or large difference in amount of the electrolytic solutions contained in the inner spaces separated by the separator causes an increase in the internal resistance of the capacitor. For those reasons, the preferable range in depth of the concave portions of the surfaces of the polarized electrodes is 2–50 micrometers.

The fourth present invention provides a method of forming an electric double layer capacitor The method comprises the steps of: forming a pair of polarized electrodes having surfaces with convex portions which extend over substantially entire parts thereof; placing the polarized electrodes to sandwich a separator so that the surfaces with the convex portions face to the separators, thereby forming inner spaces between the polarized electrodes and the separator; placing a pair of gaskets and a pair of collectors, where at least one gaskets has at least a penetrating hole; injecting an electrolytic solution through the at least penetrating hole into the inner spaces until the inner spaces are filled with the electrolytic solutions; and sealing the at least penetrating hole.

In accordance with the fourth present invention, the inner spaces are formed between opposite surfaces of the separator and the surfaces of the polarized electrodes so that the inner spaces contain additional amounts of the electrolytic solution of the capacitor, in order to increase the total amount of the electrolytic solution of the capacitor without enlargement in size of the capacitor. The increase in the total amount of the electrolytic solution suppresses the above described problem phenomenon of increase in the internal resistance of the capacitor due to less amount of the remaining electrolytic solution in the capacitor. If the total amount of the electrolytic solution is decreased to become under a certain critical amount of the capacitor, then the internal resistance of the capacitor is increased. The inner spaces containing the electrolytic solution between the separator and the polarized electrodes increases the total amount of the electrolytic solution of the capacitor, thereby increasing a difference of the certain critical amount of the electrolytic solution from the initial amount of the electrolytic solution in the capacitor. Even it is difficult to avoid any slight leakage of the electrolytic solution from the capacitor under a high temperature condition, thereby gently decreasing the electrolytic solution, then it is possible to delay appearance of increase in the internal resistance of the capacitor. As described above, if the surfaces of the polarized electrodes have concave portions to form the inner spaces, the depth of the concave portions is preferably in the range of 2–50 micrometers. If the depth of the concave portions is less than 2 micrometers, then the volume of the inner spaces or the amount of the electrolytic solutions in the inner spaces is too less to obtain the above advantage in delaying appearance of increase in the internal resistance of the capacitor. If the depth of the concave portions is over 50 micrometers, then the separator is likely to adhere with any one of the surfaces of the polarized electrodes, whereby a large difference in volume of the inner spaces containing the electrolytic solution is caused. Namely, a large difference in amount of the electrolytic solutions contained in the inner spaces separated by the separator is caused. This large difference in volume of the inner spaces containing the electrolytic solution or large difference in amount of the electrolytic solutions contained in the inner spaces separated by the separator causes an increase in the internal resistance of the capacitor. For those reasons, the preferable range in depth of the concave portions of the surfaces of the polarized electrodes is 2–50 micrometers.

PREFERRED EMBODIMENT

First Embodiment

A first embodiment according to the present invention will be described in detail with reference to the drawings. FIG. 1 is a cross sectional elevation view illustrative of a novel electric double layer capacitor in accordance with the present invention.

The novel electric double layer capacitor has a pair of solid-state polarized electrodes 2 separated from each other by a separator 3. The paired solid-state polarized electrodes 2 are sandwiched between a pair of collectors 1. A pair of gaskets 4 is further provided at opposite ends of the separator 3 so that the gaskets 4 are tightly in contact with side portions of the solid-state polarized electrodes 2. The gaskets 4 are also sandwiched between outside portions of the collectors 1. The solid-state polarized electrodes 2 have surfaces facing to the separator 3, wherein the surfaces have concave portions which extend entire parts of the surfaces, thereby forming inner spaces between the separator 3 and the solid-state polarized electrodes 2. The inner spaces are filled with an electrolytic solution.

The electrolytic solution contains a sulfuric acid solution. The separator 3 has a thickness of 30 micrometers. The separator 3 comprises a polypropylene resin as a base material. The collectors 1 comprise electrically conductive butyl rubber plates. The gaskets 4 comprise insulative ABS resins. The solid-state polarized electrodes 2 may be formed by sintering an active carbon. Each of the solid-state polarized electrodes 2 has a size of 3 cm×3 cm. A peripheral portion of the solid-state polarized electrode 2 has a thickness of 0.8 millimeters. A center portion of the solid-state polarized electrode 2 has a thickness of 0.76 millimeters.

The above first novel electric double layer capacitor may be formed as follows.

Active carbon powers are sintered to form two plate-shaped polarized electrodes 2 having a thickness of 1 millimeter and a size of 3 cm×3 cm. One surface of each of the plate-shaped polarized electrodes 2 is then subjected to a cutting process to form a concave portion which extends over an entire surface, so that the solid-state polarized electrode 2 is 0.8 millimeters in thickness of the peripheral portion and 0.76 millimeters in thickness of the center portion thereof. The paired solid-state polarized electrode 2 are placed to sandwich the separator 3 so that the processed surfaces with the concave portions face to the separator 3.

The gaskets 4 are formed by laminating gasket parts by applying junction surfaces thereof with an epoxy resin material The collectors 1 are also placed to sandwich the gaskets 4 and the solid-state polarized electrodes 2. Junction surfaces between the collectors 1 and the gaskets 4 are applied with the epoxy resin material. Thereafter, the capacitor is subjected to a heat treatment at a temperature of 120° C. for one hour to cause thermosetting of the epoxy resin material. An electrolytic solution comprising a sulfuric acid solution is injected through a penetrating hole previously formed in the gasket 4 into the inner spaces between the separator 3 and the solid-state polarized electrodes 2, so that the inner spaces are filled with the electrolytic solution and the separator 3 is immersed in the electrolytic solution. The penetrating hole is then sealed with an ABS resin martial. An epoxy resin is further applied thereon. A heat treatment is carried out at a temperature of 120° C. for one hour to cause thermosetting of the epoxy resin materials Ten of the above described first novel electric double layer capacitor were prepared in the above method for carrying out a high temperature characteristic test. The ten electric double layer capacitors were placed in a high temperature atmosphere of 85° C. with a voltage application of 1V for 2000 hours. Internal resistances were measured for the ten electric double layer capacitors before and after the test. A minimum value of the internal resistance measured before the test was 28 mΩ. A maximum value of the internal resistance measured before the test was 36 mΩ. An averaged value of the internal resistance measured before the test was 32 mΩ. A minimum value of the internal resistance measured after the test was 36 mΩ. A maximum value of the internal resistance measured after the test Was 53 mΩ. An averaged value of the internal resistance measured after the test was 41 mΩ.

First Comparative Embodiment

A first comparative embodiment will be described in detail with reference to the drawings. This first comparative embodiment is different from the first embodiment only in no internal spaces being formed between the solid-state electrodes 2 and the separator 3. Namely, the solid-state electrodes 2 have flat surfaces tightly in contact with the separator 3.

The electric double layer capacitor of the first comparative embodiment has a pair of solid-state polarized electrodes 2 separated from each other by a separator 3. The paired solid-state polarized electrodes 2 are sandwiched between a pair of collectors 1. A pair of gaskets 4 is further provided at opposite ends of the separator 3 so that the gaskets 4 are tightly in contact with side portions of the solid-state polarized electrodes 2. The gaskets 4 are also sandwiched between outside portions of the collectors 1. The solid-state polarized electrodes 2 have flat surfaces which are tightly in contact with the separator 3 without intervening any inner space.

The electrolytic solution contains a sulfuric acid solution. The separator 3 has a thickness of 30 micrometers. The separator 3 comprises a polypropylene resin as a base material. The collectors 1 comprise electrically conductive butyl rubber plates. The gaskets 4 comprise insulative ABS resins. The solid-state polarized electrodes 2 may be formed by sintering an active carbon. Each of the solid-state polarized electrodes 2 has a size of 3 cm×3 cm Each of the solid-state polarized electrodes 2 has a uniform thickness of 1 millimeter.

The above electric double layer capacitor of the first comparative example may be formed as follows.

Active carbon powers are sintered to form two plate-shaped polarized electrodes 2 having a thickness of 1 millimeter and a size of 3 cm×3 cm. The paired solid-state polarized electrode 2 are placed to sandwich the separator 3. The gaskets 4 are formed by laminating gasket parts by applying junction surfaces thereof with an epoxy resin material. The collectors 1 are also placed to sandwich the gaskets 4 and the solid-state polarized electrodes 2. Junction surfaces between the collectors 1 and the gaskets 4 are applied with the epoxy resin material. Thereafter, the capacitor is subjected to a heat treatment at a temperature of 120° C. for one hour to cause thermosetting of the epoxy resin material. An electrolytic solution comprising a sulfuric acid solution is injected through a penetrating hole previously formed in the gasket 4 to the separator 3, so that the separator 3 is immersed in the electrolytic solution. The penetrating hole is then sealed with an ABS resin martial. An epoxy resin is further applied thereon. A heat treatment is carried out at a temperature of 120° C. for one hour to cause thermosetting of the epoxy resin material.

Ten of the above described electric double layer capacitor of this first comparative embodiment were prepared in the above method for carrying out a high temperature characteristic test. The ten electric double layer capacitors were placed in a high temperature atmosphere of 85° C. with a voltage application of 1V for 2000 hours. Internal resistances were measured for the ten electric double layer capacitors before and after the test. A minimum value of the internal resistance measured before the test was 29 mΩ. A maximum value of the internal resistance measured before the test was 36 mΩ. An averaged value of the internal resistance measured before the test was 32 mΩ. A minimum value of the internal resistance measured after the test was 56 mΩ. A maximum value of the internal resistance measured after the test was 98 mΩ. An averaged value of the internal resistance measured after the test was 68 mΩ.

Second Embodiment

A second embodiment according to the present invention will be described in detail with reference to the drawings. This second embodiment is different from the above first embodiment in the thickness of the solid-state polarized electrodes 2 and the method of forming the capacitor.

The novel electric double layer capacitor has a pair of solid-state polarized electrodes 2 separated from each other by a separator 3. The paired solid-state polarized electrodes 2 are sandwiched between a pair of collectors 1. A pair of gaskets 4 is further provided at opposite ends of the separator 3 so that the gaskets 4 are tightly in contact with side portions of the solid-state polarized electrodes 2. The gaskets 4 are also sandwiched between outside portions of the collectors 1. The solid-state polarized electrodes 2 have surfaces facing to the separator 3, wherein the surfaces have concave portions which extend entire parts of the surfaces, thereby forming inner spaces between the separator 3 and the solid-state polarized electrodes 2. The inner spaces are filed with an electrolytic solution.

The electrolytic solution contains a sulfuric acid solution. The separator 3 has a thickness of 30 micrometers. The separator 3 comprises a polypropylene resin as a base material. The. collectors 1 comprise electrically conductive butyl rubber plates. The gaskets 4 comprise insulative ABS resins. The solid-state polarized electrodes 2 may be formed by sintering an active carbon. Each of the solid-state polarized electrodes 2 has a size of 3 cm×3 cm. A peripheral portion of the solid-state polarized electrode 2 has a thickness of 0.2 millimeters. A center portion of the solid-state polarized electrode 2 has a thickness of 0.16 millimeters.

The above first novel electric double layer capacitor may be formed as follows.

Active carbon powers are mixed with a binder material (PVDF) and a solvent (NMP) at a ratio in weight of 8:2:20 to prepare an active carbon paste. The active carbon paste is applied on a surface of each of the collectors 1 by a screen-printing method, thereby forming a polarized electrode film with a size of 3 cm×3 cm. A spherical surface object is pressed to the polarized electrode film to form a concave portion extending over an entire surface of the polarized electrode film. The polarized electrode film on the collector 1 is then dried at a temperature of 120° C. for one hour to remove the solvent, thereby forming a pair of a polarized electrode 2, wherein the polarized electrode 2 is 0.2 millimeters in thickness of the peripheral portion and 0.16 millimeters in thickness of the center portion thereof. The paired polarized electrode 2 are placed to sandwich the separator 3 so that the processed surfaces with the concave portions face to the separator 3. The gaskets 4 are formed by laminating gasket parts by applying junction surfaces thereof with an epoxy resin material. The collectors 1 are also placed to sandwich the gaskets 4 and the polarized electrodes 2. Junction surfaces between the collectors 1 and the gaskets 4 are applied with the epoxy resin material. Thereafter, the capacitor is subjected to a heat treatment at a temperature of 120° C. for one hour to cause thermosetting of the epoxy resin material. An electrolytic solution comprising a sulfuric acid solution is injected through a penetrating hole previously formed in the gasket 4 into the inner spaces between the separator 3 and the polarized electrodes 2, so that the inner spaces are filled with the electrolytic solution and the separator 3 is immersed in the electrolytic solution. The penetrating hole is then sealed with an ABS resin martial. An epoxy resin is further applied thereon. A heat treatment is carried out at a temperature of 120° C. for one hour to cause thermosetting of the epoxy resin material.

Ten of the above described second novel electric double layer capacitor were prepared in the above method for carrying out a high temperature characteristic test. The ten electric double layer capacitors were placed in a high temperature atmosphere of 85° C. with a voltage application of 1V for 2000 hours. Internal resistances were measured for the ten electric double layer capacitors before and after the test. A minimum value of the internal resistance measured before the test was 26 mΩ. A maximum value of the internal resistance measured before the test was 30 mΩ. An averaged value of the internal resistance measured before the test was 28 mΩ. A minimum value of the internal resistance measured after the test was 30 mΩ. A maximum value of the internal resistance measured after the test was 44 mΩ. An averaged value of the internal resistance measured after the test was 34 mΩ.

TABLE 1

|  | before test (mΩ) | | | after test (mΩ) | | |
| --- | --- | --- | --- | --- | --- | --- |
|  | min. | average | max. | min. | average | max. |
| 1$^{st}$ Em. | 28 | 32 | 36 | 36 | 41 | 53 |
| 2$^{nd}$ Em. | 26 | 28 | 30 | 30 | 34 | 44 |
| Comp. Em. | 29 | 32 | 36 | 56 | 68 | 98 |

From the above table 1, the first and second novel electric double layer capacitors having the inner spaces between the separator and the polarized electrodes show small variations in internal resistance between before and after the test, whilst the electric double layer capacitor having no inner spaces shows large variations in internal resistance between before and after the test.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An electric double layer capacitor having a pair of polarized electrodes separated by a separator, said polarized electrodes having surfaces facing to said separator, wherein substantially entire parts of said surfaces of said polarized electrodes are spaced from said separator to form inner spaces between said polarized electrodes and said separator, wherein concave portions extend over substantially entire parts of said surfaces of said polarized electrodes.

2. The electric double layer capacitor as claimed in claim 1, wherein each of said concave portions has a depth in a range of 2–50 micrometers.

3. The electric double layer capacitor as claimed in claim 1, wherein said inner spaces are filled with an electrolytic solution.

4. The electric double layer capacitor as claimed in claim 3, wherein said inner spaces have substantially the same amount of said electrolytic solution.

5. The electric double layer capacitor as claimed in claim 4, wherein said inner spaces are symmetrical in cross-sectioned shape with reference to said separator.

6. An electric double layer capacitor comprising:

a separator;

a pair of polarized electrodes separated from each other by said separator;

a pair of collectors sandwiching said polarized electrodes;

a pair of gaskets provided at opposite sides of said separator so that said gaskets are in contact tightly with opposite side surfaces of said polarized electrodes, and said gaskets are sandwiched between outside portions of said collectors, wherein substantially entire parts of said surfaces of said polarized electrodes are spaced from said separator to form inner spaces between said polarized electrodes and said separator.

7. The electric double layer capacitor as claimed in claim 6, wherein concave portions extend over substantially entire parts of said surfaces of said polarized electrodes.

8. The electric double layer capacitor as claimed in claim 7, wherein each of said concave portions has a depth in a range of 2–50 micrometers.

9. The electric double layer capacitor as claimed in claim 6, wherein said inner spaces are filled with an electrolytic solution.

10. The electric double layer capacitor as claimed in claim 9, wherein said inner spaces have substantially the same amount of said electrolytic solution.

11. The electric double layer capacitor as claimed in claim 10, wherein said inner spaces are symmetrical in cross-sectioned shape with reference to said separator.

12. A polarized electrode surface facing a separator in an electrical double layer capacitor, wherein substantially entire parts of said polarized electrode surface is spaced from said separator to form inner spaces between said polarized electrode surface and said separator, wherein a concave portion extends over substantially an entire part of said polarized electrode surface.

13. The polarized electrode surface as claimed in claim 12, wherein said concave portion has a depth in a range of 2–50 micrometers.

14. The polarized electrode surface as claimed in claim 12, wherein said inner spaces is filled with an electrolytic solution.

* * * * *